US011067756B2

(12) United States Patent
Chang (10) Patent No.: US 11,067,756 B2
(45) Date of Patent: Jul. 20, 2021

(54) SMALL FORM FACTOR STACKABLE FIBER OPTIC ADAPTER ASSEMBLIES

(71) Applicant: Senko Advanced Components Inc, Marlborough, MA (US)

(72) Inventor: Jimmy Jun-Fu Chang, Worcester, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/593,079

(22) Filed: Oct. 4, 2019

(65) Prior Publication Data

US 2020/0110224 A1 Apr. 9, 2020

Related U.S. Application Data

(60) Provisional application No. 62/742,082, filed on Oct. 5, 2018.

(51) Int. Cl.
*G02B 6/38* (2006.01)
*G02B 6/36* (2006.01)

(52) U.S. Cl.
CPC ......... *G02B 6/3676* (2013.01); *G02B 6/3825* (2013.01); *G02B 6/3831* (2013.01); *G02B 6/3897* (2013.01)

(58) Field of Classification Search
CPC .................................................. G02B 6/3825
See application file for complete search history.

(56) References Cited

U.S. PATENT DOCUMENTS 6,908,233 B2 * 6/2005 Nakajima ............ G02B 6/3807
385/53
9,268,103 B2 * 2/2016 Nguyen ............... G02B 6/3897

* cited by examiner

*Primary Examiner* — Omar R Rojas (57) ABSTRACT

A stackable adapter having opposing ports configured to accept differing fiber optic connectors along a longitudinal axis. The stackable adapter is formed from opposing partially open sidewalls having a recess and a protrusion opposite one another near a top edge and bottom edge. Mating two stackable adapters forms a stackable adapter assembly with stackable outer sidewalls for reducing the width of an array of two stackable adapters by at least one-third over placing two standard adapter side-by-side in the panel.

17 Claims, 11 Drawing Sheets

SMALL FORM FACTOR STACKABLE FIBER OPTIC ADAPTER ASSEMBLIES

RELATED APPLICATIONS

This application claims priority to U.S. Provisional patent application 62/742,082 filed on Oct. 5, 2018 titled "Miniature Stackable Fiber Optic Adapter", which is fully incorporated into this application.

FIELD OF THE INVENTION

The described technology generally relates to components for connecting data transmission elements and, more specifically, to adapters configured to connect different types of fiber optic connectors and connector assemblies configured to facilitate optimized performance of the connection formed within stackable adapters.

BACKGROUND

Fiber optics have become the standard cabling medium used by data centers to meet the growing needs for data volume, transmission speeds, and low losses. An optical fiber connector is a mechanical device disposed at an end of an optical fiber that acts as a connector of optical paths, for example, when optical fibers are joined together. An optical fiber connector may be coupled with an adapter to connect an optical fiber cable to other optical fiber cables or devices. An adapter may generally include a housing having at least one port that is configured to receive and hold a connector to facilitate the optical connection of one connector to another connector or device. For example, an LC adapter is typically configured to receive one or more standard sized LC connectors.

Stackable adapters provided structure to interconnect adapters horizontally. Since the adapters have the interconnect structure, stacking reduces width and height as a prior art metal panel mount is not needed between the adapters. Next space use is improved as the interconnected adapters are a self-supporting assembly. The metal mounting plate is removed from the interconnected adapters, reducing overall dimension of an array of stackable adapters.

Accordingly, there is a need for an adapter capable of being stacked horizontally that that occupy less space than conventional adapters with metal mounting plates.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a stackable adapter assembly may include one or more stackable adapters. A stackable adapter has channel along its longitudinal axis with opposing openings or ports configured to accept a fiber optic connector. The fiber optic connector may have one or more ferrules with one or more optical fiber therein. The ferrule is secured within a housing with a backbody and connected to an optical fiber cable. The cable interconnects to another fiber optic connector or port that may be an adapter with a fiber optic connector in a port.

In an embodiment, the stackable adapter has a channel or opening along a longitudinally axis from a first port or opening to a second port or opening. The opening is configured to accept a fiber optic connector. The fiber optic connector may be dual ferrule or single ferrule with a single optical fiber within the ferrule body, and a mechanical transfer ferrule or "MT" ferrule with two or more optical fibers within ferrule body. In this embodiment, the adapter port may contain a hook or anchor structure to accept a front housing of the fiber optic connector configured to secure to the anchor structure. In an alternate embodiment, the adapter port may contain structure such as a latch or hook that accepts the fiber optic connector. In another embodiment, the adapter port may have structure with no anchor or no hook. These structures secure the fiber optic connector within the port.

The present invention discloses a stackable adapter having opposing ports configured to accept differing fiber optic connectors along a longitudinal axis. The stackable adapter is formed from opposing partially open sidewalls having a recess and a protrusion opposite one another near a top edge and bottom edge. Mating two stackable adapters forms a stackable adapter assembly with stackable outer sidewalls for reducing the width of an array of two stackable adapters by at least one-third over placing two standard adapter side-by-side in the panel.

For the three alternative adapter ports above, the adapter outer body or adapter outer housing has at least one protrusion and one recess where an opposing adapter outer body has a corresponding recess and protrusion. This combination can be called a snap and a recess or a latch and a recess. The three adapter ports are non-limiting examples of fiber optic adapter types.

BRIEF DESCRIPTION OF THE DRAWINGS

The above and other objects of the present invention will become more readily apparent from the following detailed description taken in connection with the accompanying drawings.

DETAILED DESCRIPTION

The described technology generally relates to stackable optic adapters and fiber optic connectors configured to be coupled thereto. In some embodiments, the stackable adapters may be configured to occupy less space, for example, than conventional hybrid adapters, while facilitating optimized optical performance.

Figures 1A, 1B:
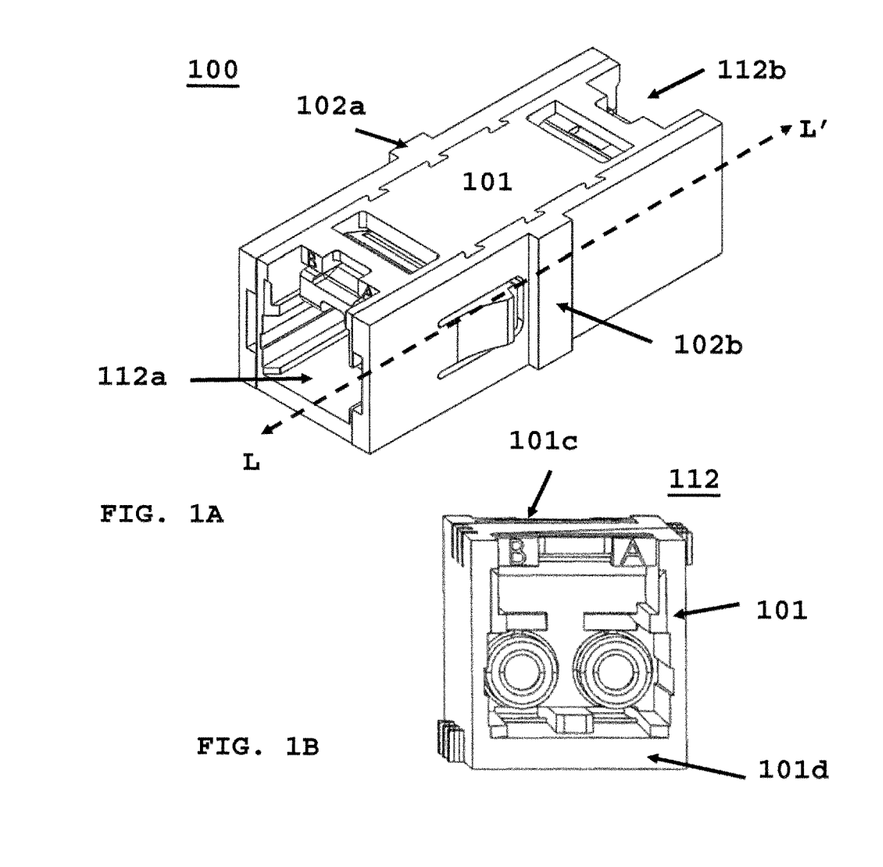
FIG. 1A is an assembled view of a single stackable adapter with a stackable outer sidewall.
FIG. 1B is a perspective end view of the stackable adapter without stackable outer sidewalls.
Figure 1C:
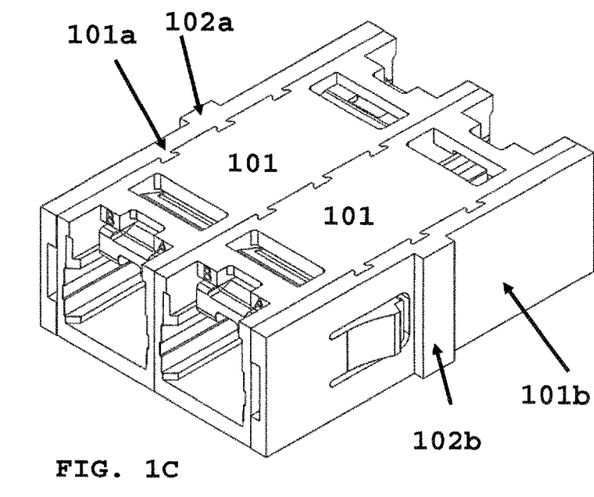
FIG. 1C is an assembled view of two stackable adapters configured horizontally with stackable outer sidewalls.

FIG. 1A depicts assembled stackable adapter 100 according to the present invention. Inner housing 101 has two stackable outer sidewalls (101a, 101b) secured to inner housing 101. Stackable adapter 100 further comprises opposing ports (112a, 112b) along it longitudinal axis L-L' configure to receive a fiber optic connector. FIG. 1C depicts stackable outer sidewalls (101a, 101b) with flange (102a, 102b) for securing adapter 100 within a panel. A sidewall has the flange when the sidewall is secured to the outer most wall adapter inner housing 101. FIG. 1B depicts an end view of stackable adapter 112 without stackable outer sidewalls (101a, 101b) or just an end view of inner housing 101 formed with integrated top wall 101c and bottom wall 101d.

Figures 2A, 2C:
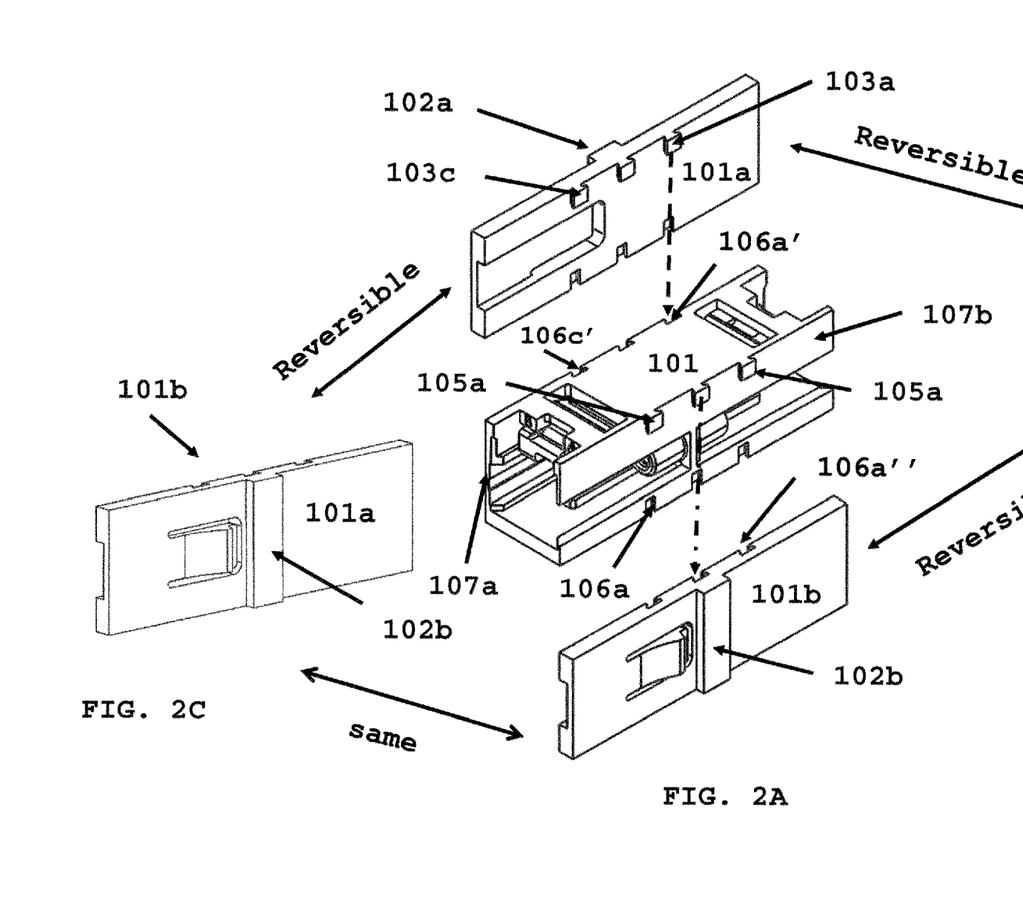
FIG. 2A is an exploded view of the stackable adapter of FIG. 1A.
FIG. 2C is a view of the reverse side of the left stackable outer sidewall of FIG. 2A.
Figure 2B:
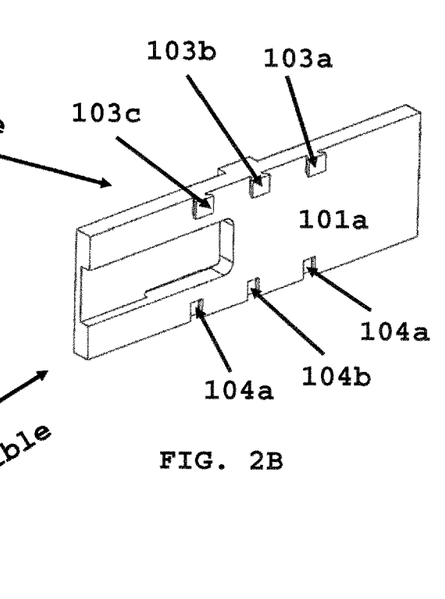
FIG. 2B is a view of the reverse side of the right stackable outer sidewall of FIG. 2A.
Figure 3:
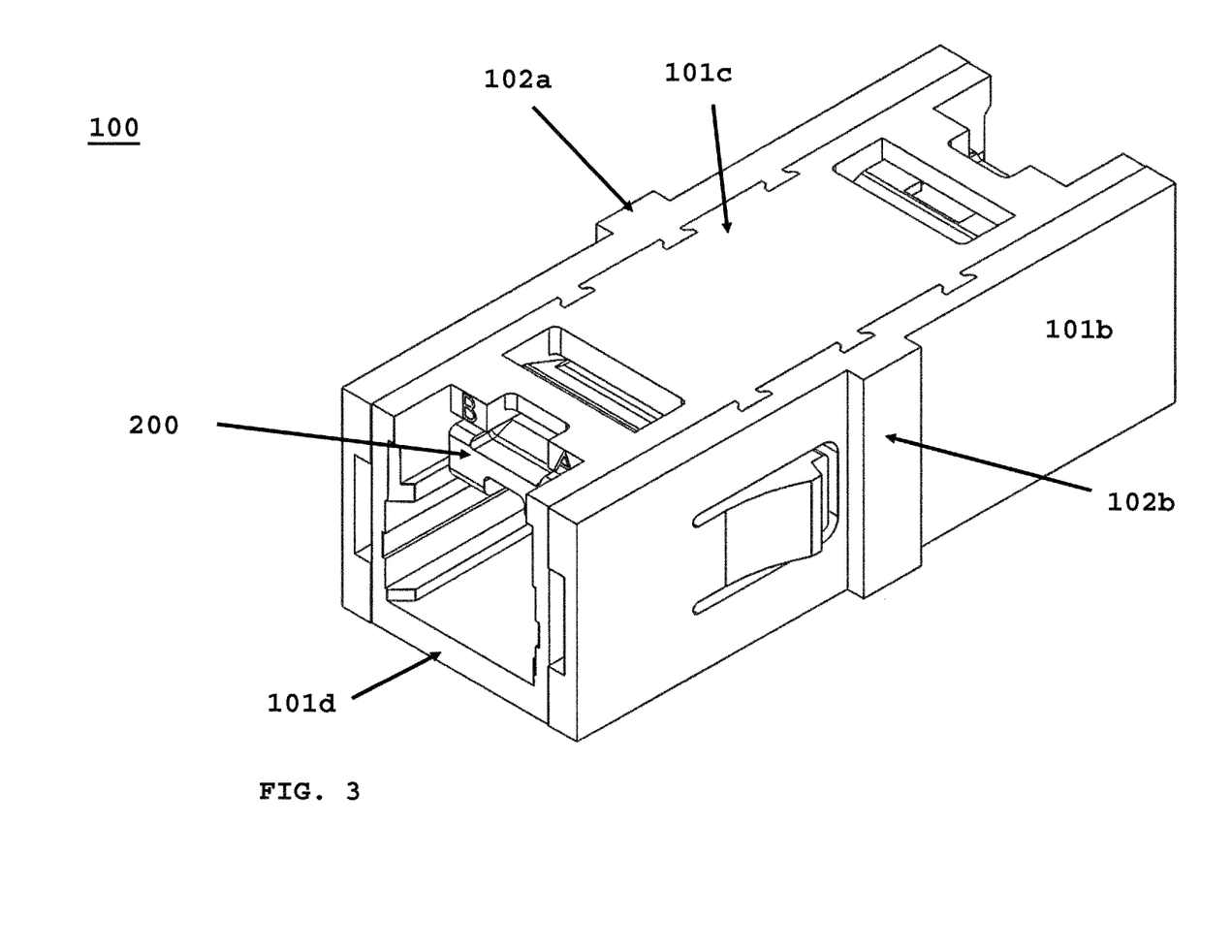
FIG. 3 is a perspective view of a stackable adapter assembled of FIG. 2A with an anchor device within a first port of the stackable adapter.

FIG. 2A depicts inner housing 101 exploded prior to assembly using stackable outer sidewall (101a, 101b). FIG. 2B and FIG. 2C further illustrates that stackable outer sidewall (101a, 101b) are reversible. FIG. 2A depicts stackable outer sidewall 101b, reversed in FIG. 2B then usable as sidewall 101a in FIG. 2A (top). FIG. 2C depicts FIG. 2A after reversals. Inner housing 101 illustrates opposing sidewall 107a to partially open sidewall 107b. Inner housing 101 is formed from the opposing sidewall 107a, the partially open sidewall 107b, top wall 101c and bottom wall 101d. Refer to FIG. 1B or FIG. 3 for top wall 101c and bottom wall 101d. Referring to FIG. 2A, inner housing 101 has plural of protrusions 105a on opposing sidewall 107b and along the same side are opposing recesses 106a. Protrusions 105a and recesses 106a are nearer opposing edges of the partially open sidewall, and the protrusions and recesses are generally opposite of one another. Referring to FIG. 2A, stackable outer sidewall 101b depicts corresponding recess 106a" that receives a protrusion 105a. Also stackable outer sidewall 101a has one or more protrusions (103a, 103b, 103c) that are accepted into corresponding opposing sidewall 107a recess (106a', 106b', 106c'). A set of protrusions substantially opposite recesses (106a'-106c') are located on opposing edges of opposing sidewall 107a. And a set of recesses (104a-104c) and set of protrusions (103a, 103b, 103c) are located on stackable outer sidewall 101a (refer to FIG. 2B) after reversing stackable outer wall 101b from FIG. 2A to FIG. 2B. A stackable adapter with two adjacent inner housings is described in FIG. 4 below. Whether stacked as adjacent inner housing 101 or not, stackable outer sidewall (101a, 101b) is secured to opposing sidewall and partially open sidewall (107a, 107b) respectively to form stackable adapter assembly (100, 500), and the recesses accept corresponding opposing protrusions.

Figure 4:
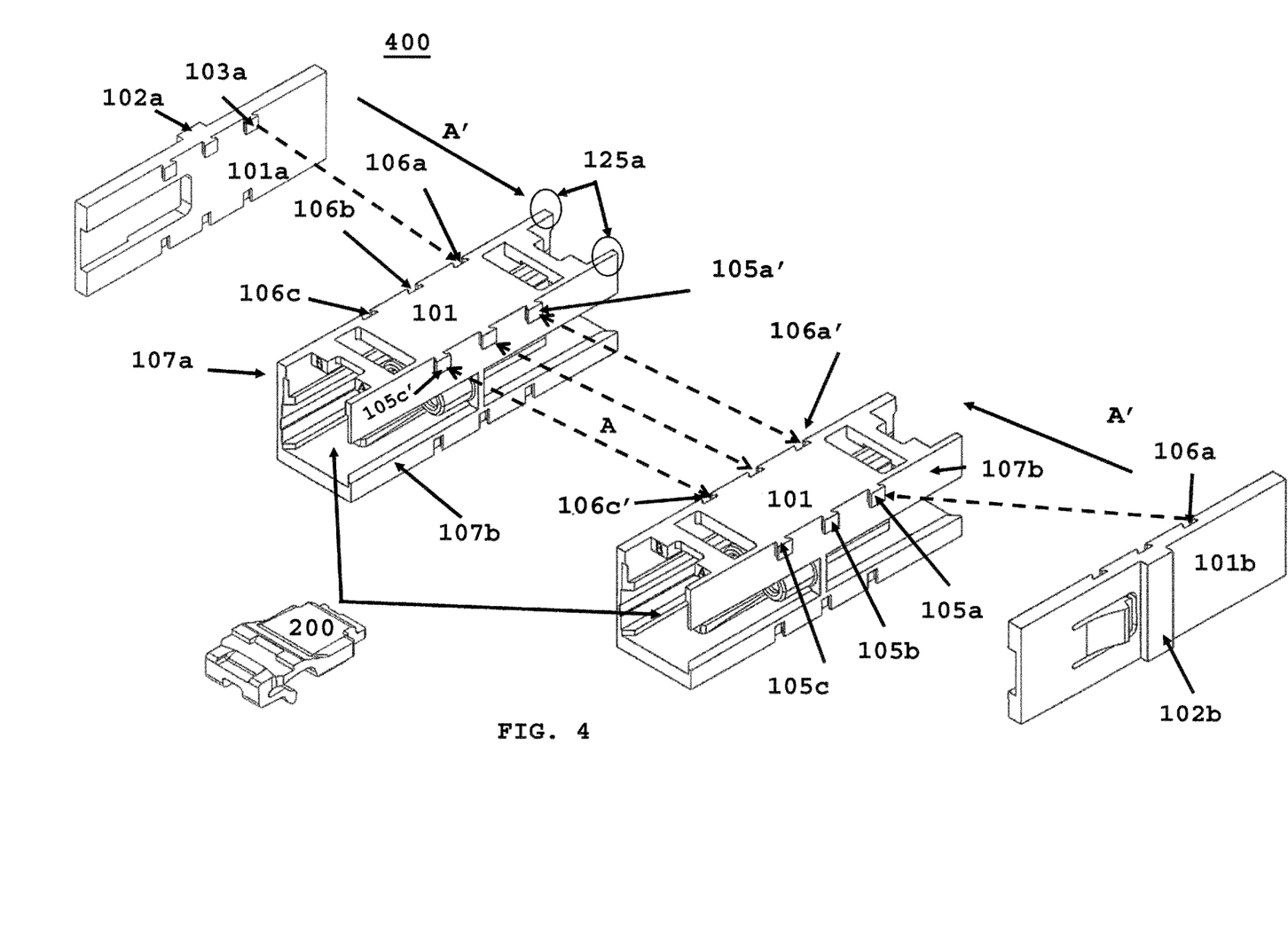
FIG. 4 is an exploded view of two stackable adapter housings prior to assembly in a horizontal direction with stackable outer walls configured for attaching to a panel.
Figures 7A, 7B:
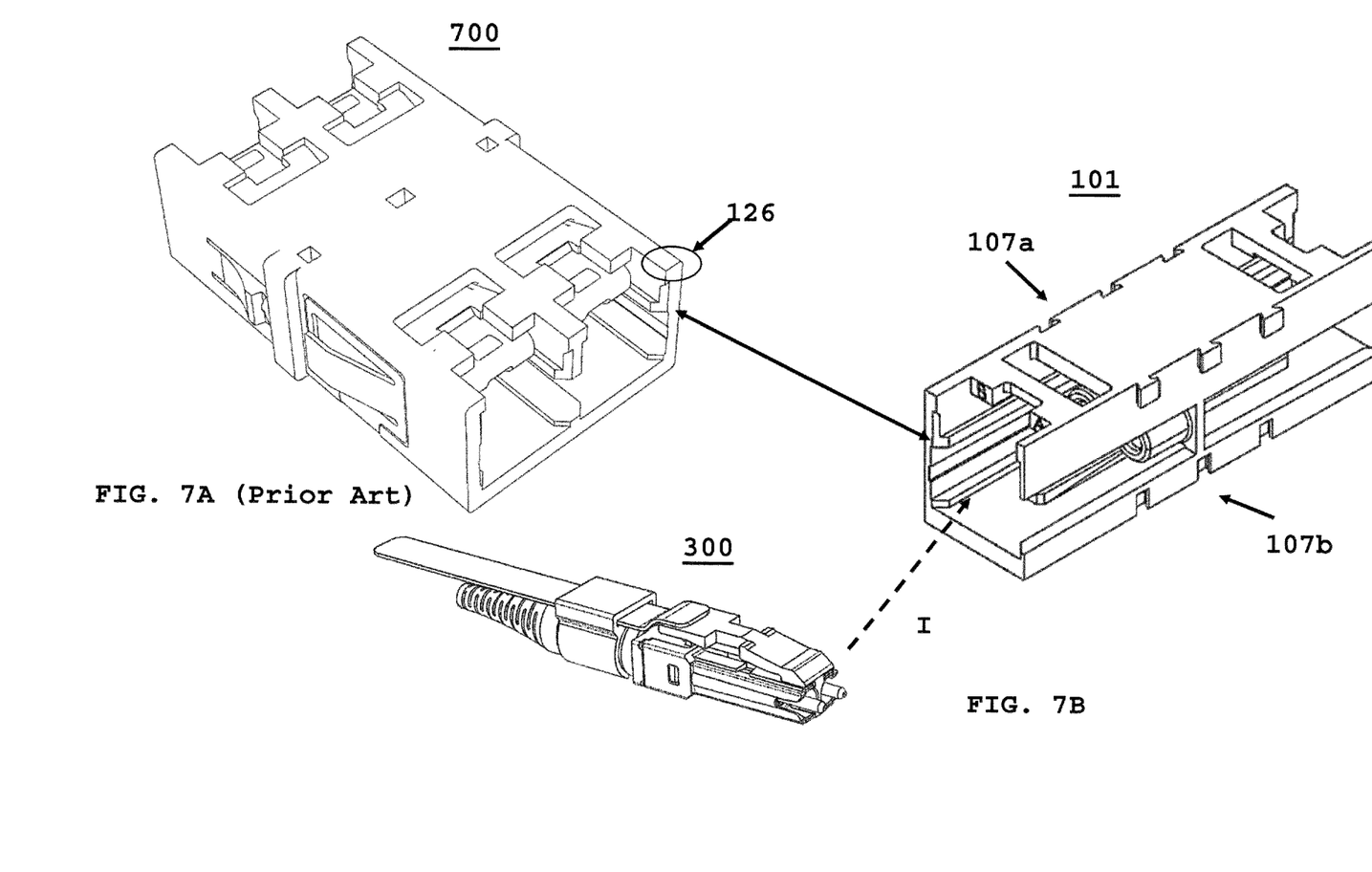
FIG. 7A is a perspective view of a prior art adapter housing without the stackable improvement.
FIG. 7B is an exploded view of the stackable adapter inner housing with a prior art fiber optic connector.

The stackable adapter deploys an inner housing with an open sidewall to reduced thickness in the sidewall over prior art adapter housings, as depicted in FIG. 7A outer sidewall thickness 126, and FIG. 4 side thickness 125a. Comparing FIG. 4 with FIG. 7A, outer sidewall thickness 126 is twice as thick as outer sidewall thickness 125a. This improvement allows more adapters to be stacked horizontally than the prior art adapters of FIG. 7A. This is obvious when flange (102a, 102b) is not deployed in the stackable assembly (500) (refer to FIG. 5) until stackable outer sidewall (101a, 101b) is secured to inner housing 101 as described herein. Forming a stackable adapter assembly from two stackable adapters reduces overall width by at least one outer sidewall over a standard adapter (refer to FIG. 7A). Forming a stackable adapter assembly from four stackable adapters reduces the overall width by at least two outer sidewalls of a standard adapter. FIG. 3 depicts assembled stackable adapter 100 with anchor 200. Anchor 200 secures a fiber optic connector within the adapter port. Top wall 101c and bottom wall 101d forms inner housing (refer to FIG. 3) with partially open sidewall 107b and opposing sidewall 107a as described above.

Figure 5:
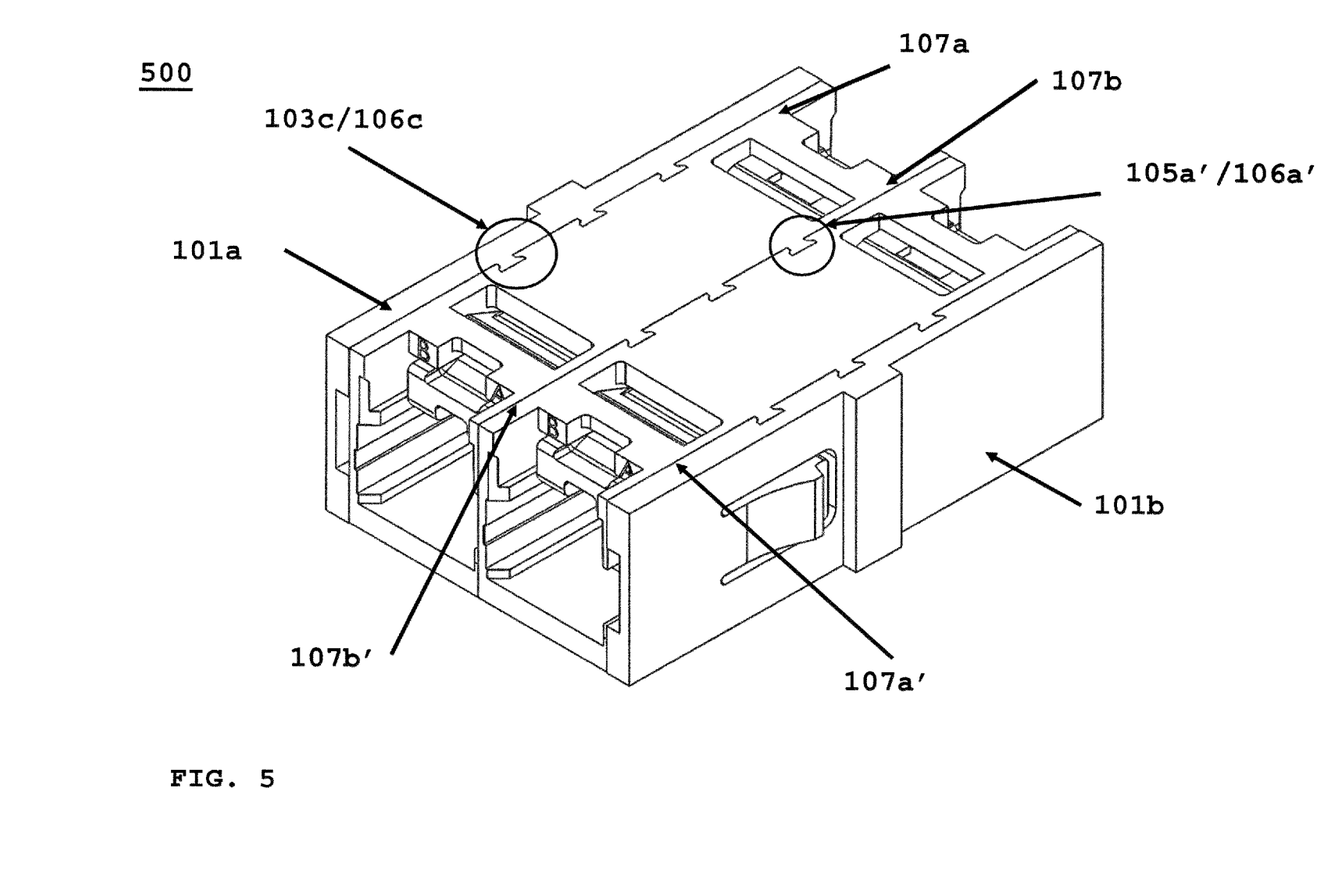
FIG. 5 is an assembled view of FIG. 4.

FIG. 4 is an exploded view of stacking two adapter inner housings 101 along dotted arrows "A", where protrusions (105a'-105c') are accepted into corresponding recesses (106a'-106c') to secure two stackable adapters side by side to form stackable adapter assembly 400 from a plural of stackable adapters inner housings 101. Once the inner housings are attached together, stackable outer sidewalls (101a, 101b) with flanges (102a, 102b) are secured to opposing sidewall and partially open sidewall (107a, 107b) respectively as depicted by arrow "A'". FIG. 5 depicts stackable adapter assembly 400 assembled 500. Protrusion 103c and recess 106c are secured together that holds stackable outer sidewall 101a to opposing sidewall 107a, and likewise, stackable outer sidewall 101b is secured to opposing sidewall 107a'. First stackable adapter partially open sidewall 107b is secured to second stackable adapter partially open sidewall 107b' using protrusion 105a' and recess 106' pairings.

Figure 6:
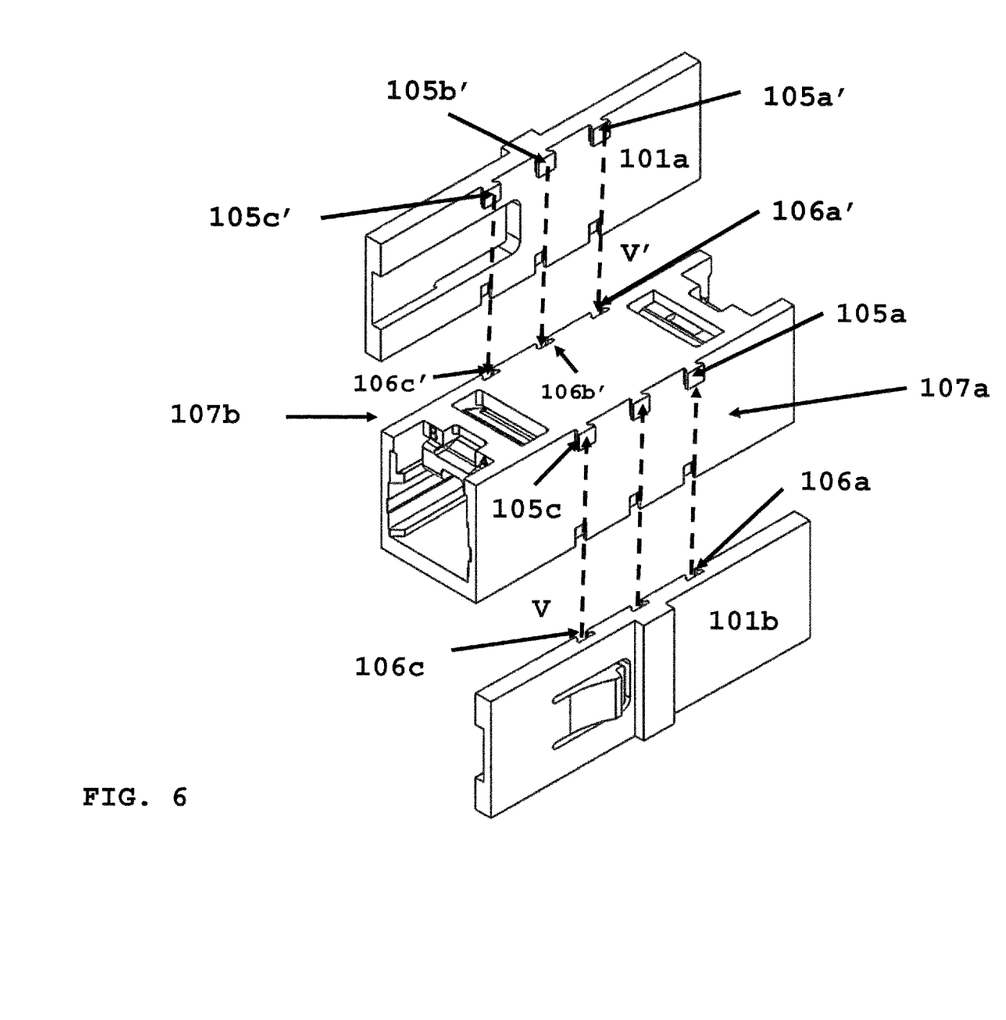
FIG. 6 is an exploded view of an assembly of stackable adapter outer housings to stackable adapter inner housing.

FIG. 6 depicts how stackable outer sidewall (101a, 101b) is secured to opposing sidewall and partially open sidewall (107a, 107b) respectively. Protrusion 105a' is received in recess or channel 106a' along dotted line "V'". Likewise, protrusions (105b', 105c') are received in recesses (106b', 106c') respectively. Protrusion 105a is received into recess or channel 106a along dotted line "V". Likewise (106b, 106c) receive protrusions (105b, 105c) in FIG. 6. A protrusion may be slide into a recess formed as a channel or snapped into a recess depending on the mechanical interface selected. FIG. 7A depicts prior art adapter 700 without partially open side wall 107b as depicted in FIG. 7B. FIG. 7B depicts inner housing 101 with opposing side wall and partially open sidewall (107a, 107b) respectively prior to inserting fiber optic connector 300 into the adapter port in direction of dotted arrow "I". Fiber optic connector 300 depicted in FIG. 7B is disclosed in U.S. Pat. Application US2018/0217339A1 "Remote Release Tab Connector Assembly" and anchor device 200 is disclosed in U.S. Pat. No. 10,185,100 "Modular Connector and Adapter Assembly Using a Removable Anchor Device", the contents of both patents are incorporated herein by reference, and assigned to the applicant of the present invention.

Figures 8A, 8B:
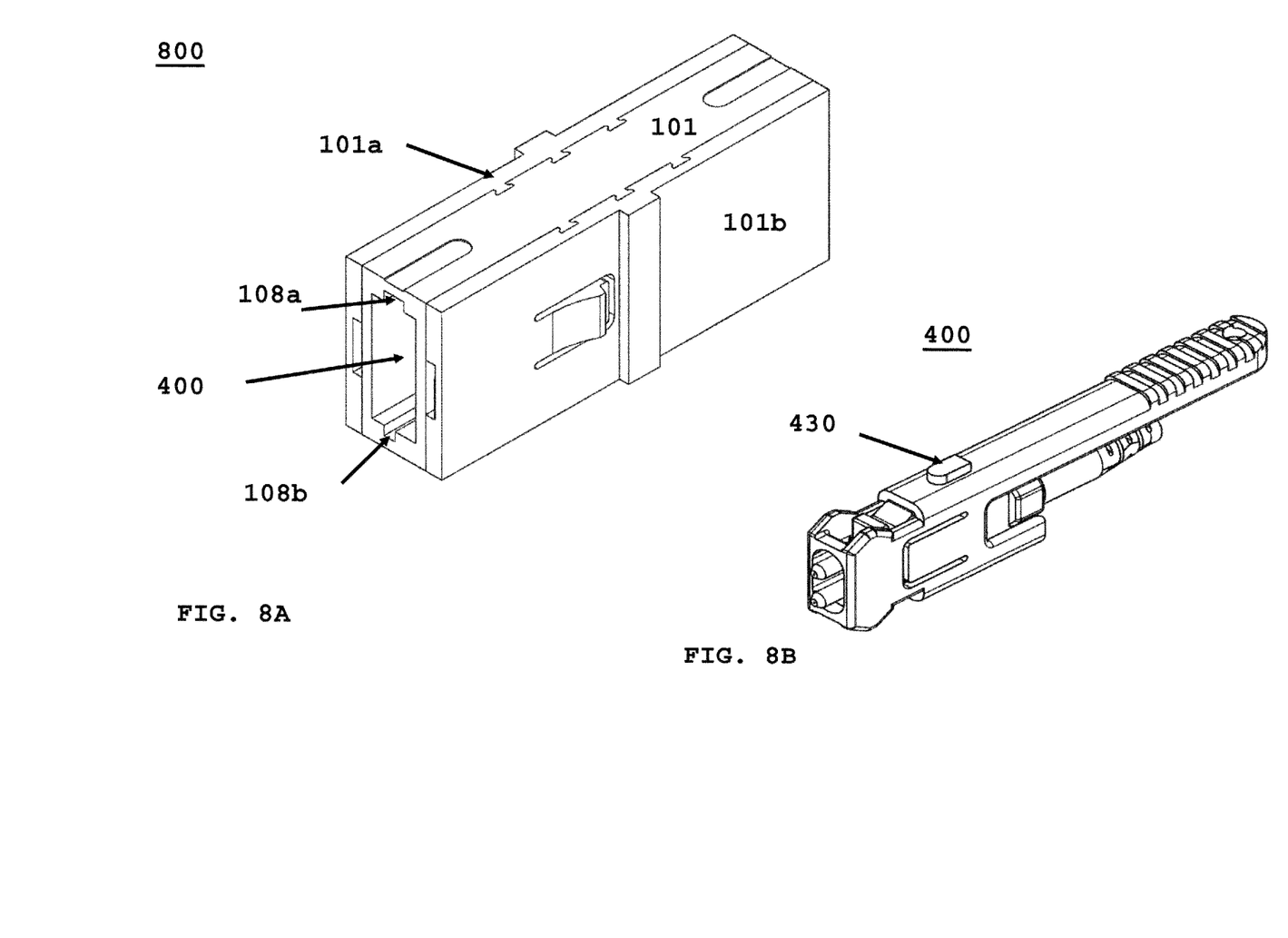
FIG. 8A is a perspective view of the stackable adapter formed using a SN® adapter.
FIG. 8B is a perspective view of a SN® fiber connector.
Figure 9A:
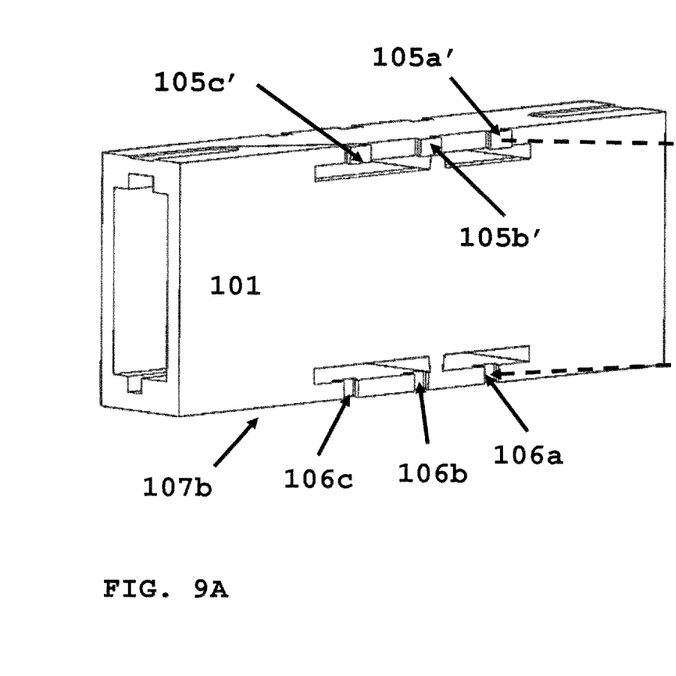
FIG. 9A is a perspective view of an inner housing of the stackable adapter of FIG. 8A.
Figure 9B:
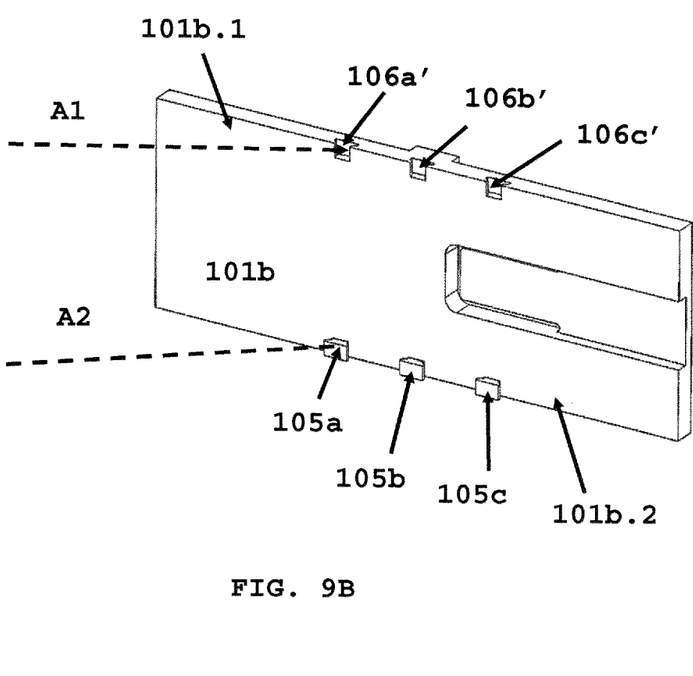
FIG. 9B is a perspective side view of a sidewall of the stackable adapter of FIG. 8A.
Figure 10:
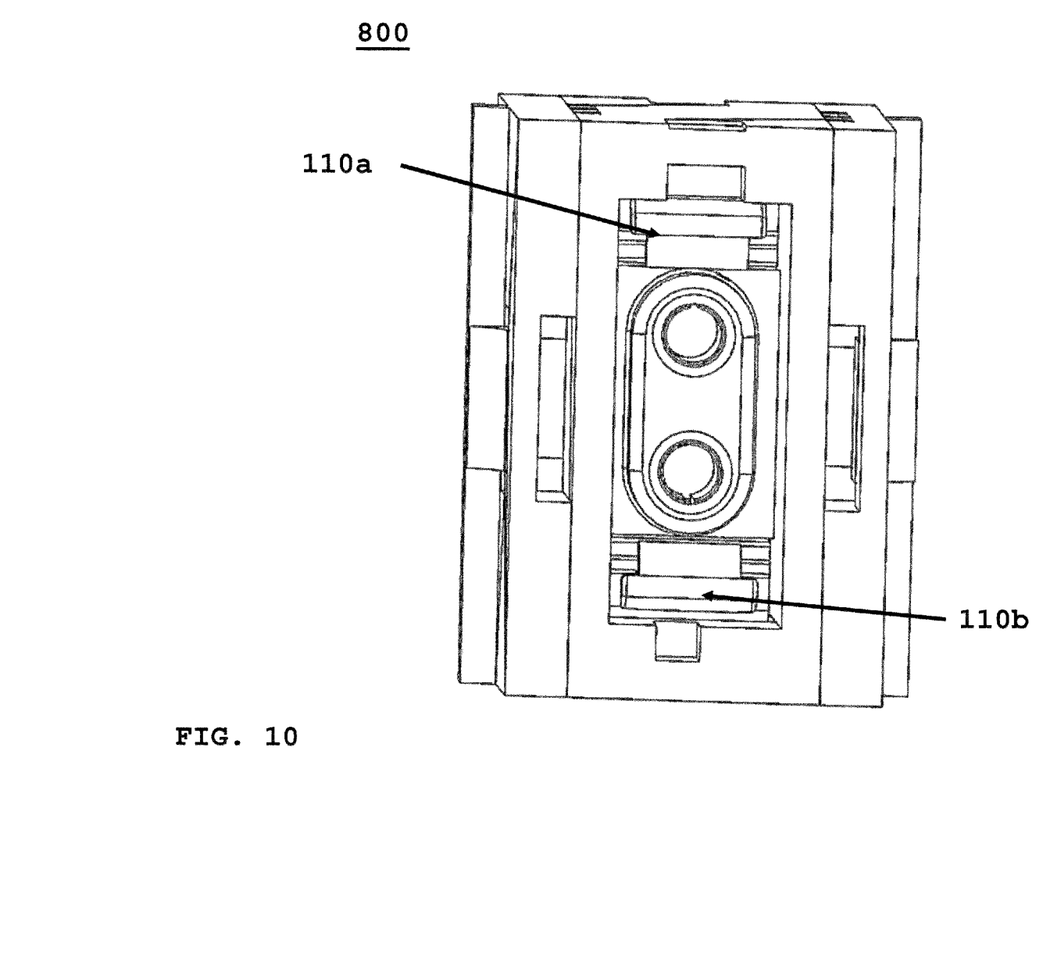
FIG. 10 is an end view of the stackable adapter of FIG. 8A.
Figure 11:
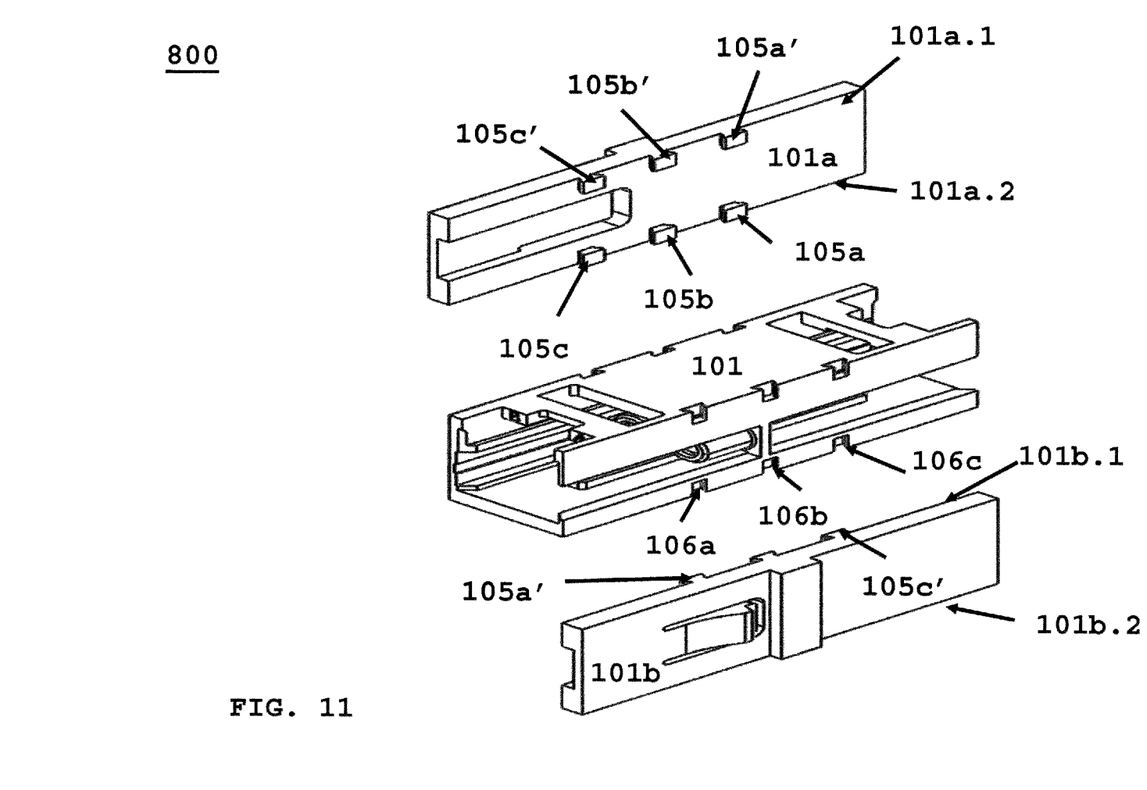
FIG. 11 is an exploded view of another embodiment of the stackable adapter.

FIG. 8A depicts stackable adapter 800 with one inner housing 101 that can accept a SN® fiber optic connector (400) (refer to FIG. 8B) that is aligned into an adapter port using alignment slots (108a, 108b) that accept alignment key (430) on the fiber optic connector sold by the assignee of the present invention. The applicant is not claiming the trademark registration of SN in this application. FIG. 9A depicts inner housing 101 with partially open sidewall 107b having one or more protrusions (105a', 105b', 105c') that correspond to recess (106a', 106b', 106c') respectively (refer to FIG. 9B). FIG. 9B depicts stackable outer sidewall 101b that likewise has opposing recess and protrusion pairings along top edge 101b.1 and bottom edge 101b.2 respectively, which is opposite the pairings of FIG. 9A sidewall 107b. As shown by dotted arrow "A1", sidewall 107b protrusion 105a' is accepted within stackable outer sidewall 101b recess 106a', and likewise from 105b' to 106b' and 105c' to 106c'. Arrow "A2' shows recesses (106a, 106b, 106c) is configured to receive opposing protrusions (105a, 105b, 105c) on stackable outer sidewall 101b respectively. FIG. 10 depicts an end view of stackable adapter 800 port with opposing adapter latches (110a, 110b) configured to secure fiber optic connector 400 (refer to FIG. 4) within the port. FIG. 11 depicts an exploded view of second embodiment of stackable adapter 800 where outer stackable outer sidewall (101a, 101b) have protrusions (105a', 105b', 105c') substantially opposite protrusions (105a, 105b, 105c) along top edge (101a.1, 101b.1) and bottom edge (101a.2, 101b.2) of stacked outer sidewall (101a, 101b). The protrusions are received in corresponding recesses respectively on an outer wall of inner housing 101.

Various embodiments of hybrid adapters disclosed herein may also be configured for use with other simplified connectors rather than micro connectors on one side. Also, in lieu of duplex LC adapters, embodiments may be configured for use with other standard size adapters, such as single LC adapters, on the opposite side.

One advantage of embodiments of adapters and connectors provided herein is reduction of the adapter size on the side that protrudes inside a module. Another advantage is inclusion of a ferrule spring to allow ferrule motions without the need for a full sized connector on the adapter side that, for example, protrudes inside a module. Specifically, embodiments provide an LC adapter having a smaller size inside a module, and providing a spring loaded motion for the optical fiber ferrule inside the module when the adapter is mated externally with a conventional LC connector. Thus, various embodiments require less space inside a module, as compared to conventional adapters, without sacrificing optical performance. Various parts, components or configurations described with respect to any one embodiment above may also be adapted to any others of the embodiments provided.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). The phrase "A or B" will be understood to include the possibilities of "A" or "B" or "A and B.

What is claimed:

1. A stackable adapter, comprising:
an inner housing is formed from at least one partially open sidewall and opposite first and second end walls spaced apart along a longitudinal axis having adapter ports formed therein for receiving fiber optic connectors;
the partially open sidewall has at least one latch and at least one recess and an opening between the latch and the at least one recess, the opening extending along the longitudinal axis and having an open end that opens through the first end wall, and wherein
the at least one latch and the at least one recess are near a top edge of the open sidewall and a bottom edge of the at least one partially open sidewall;
wherein the at least one latch and the at least one recess are configured to selectively retain another piece on the inner housing such that the other piece is in side-by-side relation with the partially open sidewall and the partially open sidewall faces the other piece.

2. The stackable adapter according to claim 1, wherein the inner housing further comprises an opposing sidewall, a top wall and a bottom wall perpendicular to the opposing sidewall and partially open sidewall.

3. The stackable adapter according to claim 2, wherein at least one of the adapter ports contains at least one alignment slot to accept an alignment key on a fiber optic connector.

4. The stackable adapter according to claim 1, in combination with a second stackable adapter secured to the partially open sidewall of the stackable adapter.

5. The stackable adapter according to claim 4, wherein the second stackable adapter includes a partially open sidewall, further in combination with a third stackable adapter secured to a partially open sidewall of the second stackable adapter.

6. The stackable adapter according to claim 2, further comprising a first stackable outer sidewall configured to be secured to one of the partially open side wall and the opposing sidewall, and a second stackable outer sidewall configured to be secured to the other of the partially open sidewall and the opposing sidewall.

7. The stackable adapter according to claim 6, wherein the first stackable outer sidewall and the second stackable outer sidewall each further comprise a flange for securing the stackable adapter to a panel.

8. The stackable adapter according to claim 6, wherein the first stackable outer sidewall and the second stackable outer sidewall are reversible.

9. A stackable adapter assembly, comprising:
a first stackable adapter with an inner housing with at least one partially open sidewall, an opposing sidewall, and opposite first and second end walls spaced apart along a longitudinal axis having adapter ports for receiving optical connectors,
the partially open sidewall has a top edge and a bottom edge, at least one latch along one of the top edge and the bottom edge and at least one recess along the other of the top edge and the bottom edge of the partially open sidewall, and an opening through the partially open sidewall between the at least one latch and the at least one recess, the opening extending along the longitudinal axis and having an open end that opens through the first end wall;
a second stackable adapter having a partially open sidewall substantially similar to the first stackable adapter, the second stackable adapter is mated with the first stackable adapter along the partially open sidewall such that the second stackable adapter is retained by the at least one latch and the at least one recess on the first stackable adapter in side-by-side relation with the partially open side-wall and the partially open sidewall faces the second stackable adapter; and
a first stackable outer sidewall secured to the opposing sidewall of the first stackable adapter.

10. A stackable adapter, comprising:
an inner housing is formed from at least one partially open sidewall and opposite first and second end walls spaced apart along a longitudinal axis having adapter ports formed therein for receiving fiber optic connectors;
the partially open sidewall has at least one latch or at least one recess; and wherein
the at least one latch or the at least one recess are near a top edge of the open sidewall or a bottom edge of each partially open sidewall;
the partially open side wall defining an opening between the top edge and the bottom edge, the opening extending along the longitudinal axis and having an open end that opens through the first end wall;
wherein the partially open sidewall extends generally in a sidewall plane;
wherein the at least one latch or the at least one recess is configured to couple to another piece for retaining the other piece on the inner housing in side-by-side relation with the partially open sidewall by sliding relative to the other piece along the sidewall plane;
wherein the at least one latch or the at least one recess is configured to retain the other piece on the inner housing in side-by-side relation with the partially open sidewall such that the partially open sidewall faces the other piece.

11. The stackable adapter according to claim 10, wherein the partially open sidewall has an opposing sidewall, and the partially open sidewall and the opposing sidewall further comprises a top wall and a bottom wall perpendicular to the opposing sidewall and the partially open sidewall to form the inner housing.

12. The stackable adapter according to claim 11, wherein at least one of the adapter ports contains an anchor device configured to accept a fiber optic connector.

13. The stackable adapter according to claim 11, wherein the inner housing has opposing latches configured to accept a fiber optic connector.

14. A stackable adapter, comprising:
an inner housing is formed from at least one partially open sidewall and opposite first and second end walls spaced apart along a longitudinal axis having adapter ports formed therein for receiving fiber optic connectors;
the partially open sidewall has at least one latch and/or at least one recess substantially opposite each other, and wherein
the at least one latch and/or the at least one recess are near at least one edge of the open sidewall;
the partially open side wall defining an opening extending along the longitudinal axis and having an open end that opens through the first end wall;

wherein the partially open sidewall extends generally in a sidewall plane;

wherein the at least one latch and/or the at least one recess is configured to couple to another piece for retaining the other piece on the inner housing in side-by-side relation with the partially open sidewall by sliding relative to the other piece along the sidewall plane wherein the at least one latch and/or the at least one recess is configured to retain the other piece on the inner housing in side-by-side relation with the partially open sidewall such that the partially open sidewall faces the other piece.

15. The stackable adapter according to claim 14, wherein partially open sidewall has an opposing sidewall, and the partially open sidewall and the opposing sidewall further comprises a top wall and a bottom wall perpendicular to the opposing sidewall and partially open sidewall to form the inner housing.

16. The stackable adapter according to claim 15, wherein a second stackable adapter is secured to the partially open sidewall of the stackable adapter.

17. The stackable adapter according to claim 16, wherein a third stackable adapter is secured to a partially open sidewall of the second stackable adapter forming a stackable adapter assembly.

* * * * *